US012754833B1

(12) United States Patent
Yu et al.

(10) Patent No.: US 12,754,833 B1
(45) Date of Patent: Oct. 6, 2026

(54) OPTIMIZED METADATA PREDICTION

(71) Applicant: Dell Products L.P., Round Rock, TX (US)

(72) Inventors: Rong Yu, West Roxbury, MA (US); Lixin Pang, Needham, MA (US); Michael Scharland, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/188,490

(22) Filed: Apr. 24, 2025

(51) Int. Cl.
*G06F 12/02* (2006.01)
*G06F 12/0802* (2016.01)

(52) U.S. Cl.
CPC ...... *G06F 12/0223* (2013.01); *G06F 12/0802* (2013.01); *G06F 2212/262* (2013.01); *G06F 2212/45* (2013.01)

(58) Field of Classification Search
CPC ............. G06F 12/0223; G06F 12/0802; G06F 2212/262; G06F 2212/45
See application file for complete search history.

(56) References Cited

U.S. PATENT DOCUMENTS

| | | | | |
|---|---|---|---|---|
| 12,197,762 | B1 * | 1/2025 | Doddaiah | G06F 3/065 |
| 2019/0258579 | A1 * | 8/2019 | Carey | G06F 12/0238 |
| 2021/0182020 | A1 * | 6/2021 | Kanuganti | G06F 3/167 |
| 2021/0216468 | A1 * | 7/2021 | Wu | G06F 11/3034 |
| 2021/0303398 | A1 * | 9/2021 | Lathrop | G06F 3/0619 |

* cited by examiner

*Primary Examiner* — Sean D Rossiter
(74) *Attorney, Agent, or Firm* — Daly, Crowley, Mofford & Durkee, LLP.

(57) ABSTRACT

A method for use in a storage system, comprising: receiving a write request; identifying a sector that corresponds to the write request; detecting whether a true copy of a sector signature is stored in a cache, wherein the sector signature includes plurality of block-specific portions, each block-specific portion corresponding to a different one of a plurality of blocks in the sector; when the true copy of the sector signature is stored in the cache, acknowledging the write request and subsequently completing the write request; when the true copy of the sector signature is not stored in the cache, generating a predicted copy of the sector signature based on a plurality of sector signatures that have been stored in the cache during a predetermined period, acknowledging the write request, retrieving the true copy of the sector signature, reconciling the predicted copy of the sector signature, and completing the write request.

20 Claims, 15 Drawing Sheets

| | | | | | | | | |
|---|---|---|---|---|---|---|---|---|
| Time = T1 | 00 | 00 | 00 | 00 | 00 | 00 | 00 | 00 |
| Time = T2 | 01 | 01 | 01 | 01 | 01 | 01 | 01 | 01 |
| Time = T3 | 10 | 10 | 10 | 10 | 10 | 10 | 10 | 10 |
| Time = T4 | 11 | 11 | 11 | 11 | 11 | 11 | 11 | 11 |
| Time = T5 | 00 | 00 | 00 | 00 | 00 | 00 | 00 | 00 |

FIG. 1J

147

| SECTOR ADDR. | SECTOR SIGNATURE | |
|---|---|---|
| 0 | 0xAAAAAA | 231 |
| 1 | 0xAAAAAA | 231 |
| 2 | 0xAAAAAA | 231 |
| 3 | 0xAAAAAA | 231 |
| 8 | 0xAAAAAA | 231 |
| 9 | 0xAAAAAA | 231 |
| A | 0xAAAAAA | 231 |
| B | 0xAAAAAA | 231 |
| 0x14 | 0xAAAAAA | 231 |
| 0x15 | 0xAAAAAA | 231 |
| 0x16 | 0xAAAAAA | 231 |
| 0x17 | 0xAAAAAA | 231 |

<PROBLEM: PREDICT SIGNATURE FOR SECTO 0x18>

| | |
|---|---|
| 0x18 | ? |

FIG. 2B

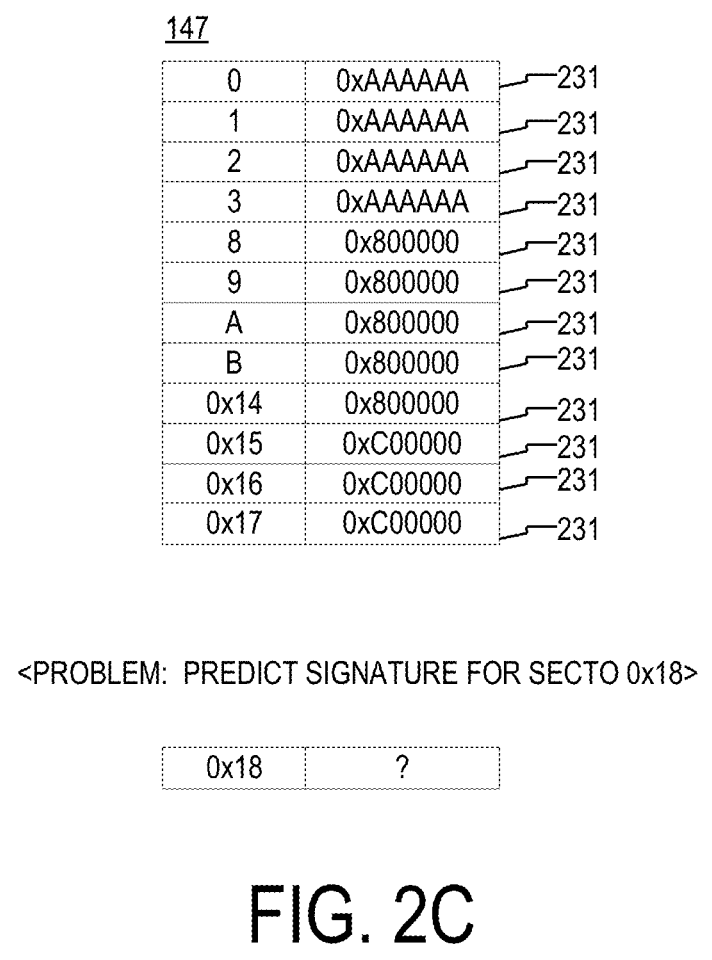

147

| | | |
|---|---|---|
| 0 | 0xAAAAAA | 231 |
| 1 | 0xAAAAAA | 231 |
| 2 | 0xAAAAAA | 231 |
| 3 | 0xAAAAAA | 231 |
| 8 | 0x800000 | 231 |
| 9 | 0x800000 | 231 |
| A | 0x800000 | 231 |
| B | 0x800000 | 231 |
| 0x14 | 0x800000 | 231 |
| 0x15 | 0xC00000 | 231 |
| 0x16 | 0xC00000 | 231 |
| 0x17 | 0xC00000 | 231 |

<PROBLEM: PREDICT SIGNATURE FOR SECTO 0x18>

| | |
|---|---|
| 0x18 | ? |

FIG. 2C

OPTIMIZED METADATA PREDICTION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, method is provided for use in a storage system, comprising: receiving a write request; identifying a sector that corresponds to the write request, the sector being a unit of storage in a permanent storage of the storage system, the sector including a plurality of blocks; detecting whether a true copy of a sector signature corresponding to the write request is stored in a cache, wherein the sector signature includes plurality of block-specific portions, each block-specific portion corresponding to a different one of the plurality of blocks, each block-specific portion being a counter that is incremented every time data is written to the block-specific portion's corresponding block; when the true copy of the sector signature is stored in the cache, acknowledging the write request and subsequently completing the write request; when the true copy of the sector signature is not stored in the cache, generating a predicted copy of the sector signature based on a plurality of sector signatures that have been stored in the cache during a predetermined period, acknowledging the write request after the predicted copy of the sector signature is generated, retrieving the true copy of the sector signature from the permanent storage, reconciling the predicted copy of the sector signature with the retrieved true copy of the sector signature, the reconciling being performed to after the write request is acknowledged, and completing the write request after the predicted copy of the sector signature is reconciled with the true copy of the sector signature.

According to aspects of the disclosure, a system is provided, comprising: a memory; and at least one processor that is operatively coupled to the memory, the at least one processor being configured to perform the operations of: receiving a write request; identifying a sector that corresponds to the write request, the sector being a unit of storage in a permanent storage, the sector including a plurality of blocks; detecting whether a true copy of a sector signature corresponding to the write request is stored in a cache, wherein the sector signature includes plurality of block-specific portions, each block-specific portion corresponding to a different one of the plurality of blocks, each block-specific portion being a counter that is incremented every time data is written to the block-specific portion's corresponding block; when the true copy of the sector signature is stored in the cache, acknowledging the write request and subsequently completing the write request; when the true copy of the sector signature is not stored in the cache, generating a predicted copy of the sector signature based on a plurality of sector signatures that have been stored in the cache during a predetermined period, acknowledging the write request after the predicted copy of the sector signature is generated, retrieving the true copy of the sector signature from the permanent storage, reconciling the predicted copy of the sector signature with the retrieved true copy of the sector signature, the reconciling being performed to after the write request is acknowledged, and completing the write request after the predicted copy of the sector signature is reconciled with the true copy of the sector signature.

According to aspects of the disclosure, a method is provided for use in a storage system, comprising: receiving a write request; detecting whether a true copy of metadata corresponding to the write request is stored in a cache; when the true copy of the metadata is stored in the cache, acknowledging the write request and subsequently completing the write request; when the true copy of the metadata is not stored in the cache, generating a predicted copy of the metadata, retrieving the true copy of the metadata from a permanent storage, reconciling the predicted copy of the metadata with the retrieved true copy of the metadata, the reconciling being performed to after the write request is acknowledged, and completing the write request after the predicted copy of the metadata is reconciled with the true copy of the metadata, wherein the reconciling is performed concurrently with the write request being aged out in an aging queue.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1J is a diagram illustrating how the value of a sector signature changes over a given time period, according to aspects of the disclosure;

FIG. 2B is a diagram illustrating a method for generating a predicted sector signature, according to aspects of the disclosure;

FIG. 2C is a diagram illustrating a method for generating a predicted sector signature, according to aspects of the disclosure;

DETAILED DESCRIPTION

Figure 1A:
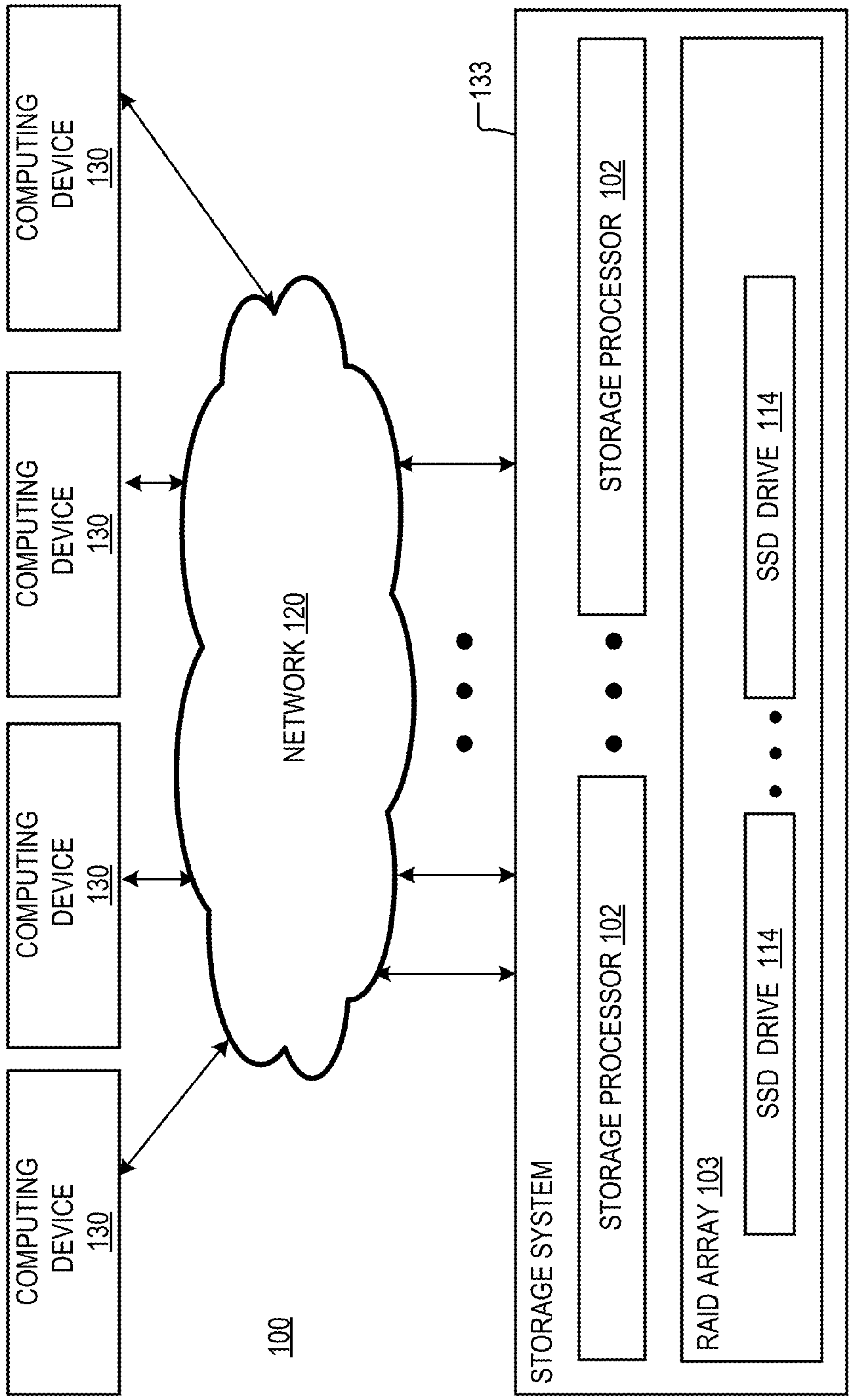
FIG. 1A is a diagram of an example of a system, according to aspects of the disclosure.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from the storage system 133. Each of the computing devices may be the same or similar to the computing device 400, which is discussed further below with respect to FIG. 4. The communications network 120 may include one or more of the Internet, a local area network (LAN), a wide area network (WAN), an InfiniBand network, a mobile data network, etc. Storage system 133 may include a plurality of storage processors 102 and a plurality of storage devices 114. In some implementations, each of the storage devices 114 may include a Solid-State Drive (SSD), a Non-Volatile Memory Express (NV ME) device, a hard disk, and/or any other suitable type of storage device. According to the present example, the storage devices are arranged in a RAID array 103. Each of the storage processors 102 may include a computing device, such as the computing device 400, which is discussed further below with respect to FIG. 4. Each of the storage processors 102 may be configured to receive I/O requests from the computing devices 130 and execute the received requests by reading or writing data to the RAID array 103.

Figure 1B:
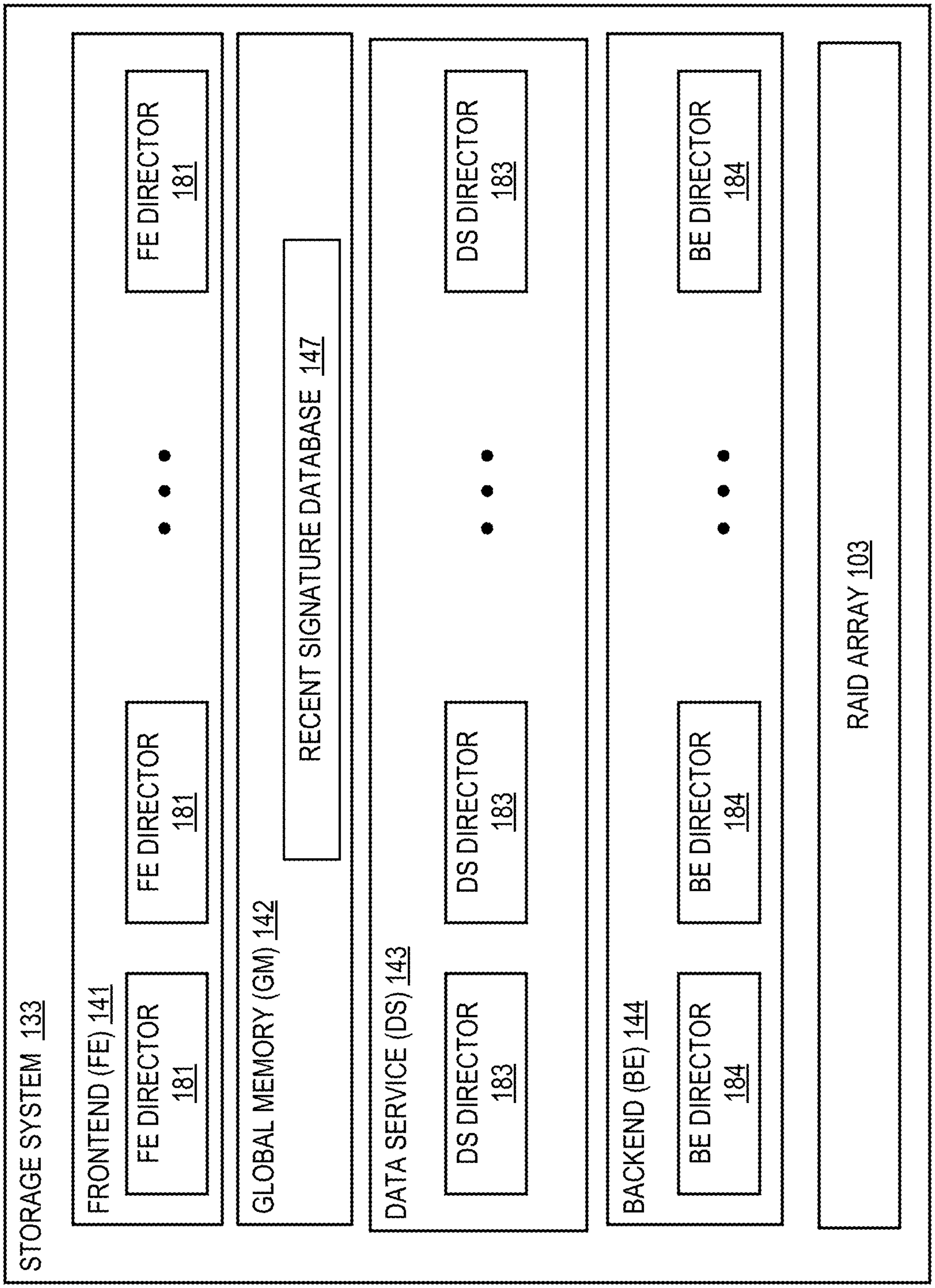
FIG. 1B is a diagram of an example of a storage system, according to aspects of the disclosure.

FIG. 1B is a diagram illustrating aspects of the operation of storage system 133, according to aspects of the disclosure. As illustrated, the storage system 133 may include a frontend (FE) 141, a global memory (GM) 142, a data service (DS) 143, and a backend (BE) 144. FE 141 may be comprised of one or more FE directors 181. Each FE director 181 may include one or more processes that are executed on a respective one of the storage processors 102. DS 143 may be comprised of one or more DS directors 183. Each DS director 183 may include one or more processes that are executed on a respective one of the storage processors 102. BE 144 may be comprised of one or more BE directors 184. Each BE director 184 may include one or more processes that are executed on a respective one of the storage processors 102. GM 142 includes a shared memory space that is used by storage system 133 for caching data. GM 142 may include a plurality of memory portions that are united in the same address space, wherein each of the plurality of memory portions is part of the volatile memory (e.g., DRAM) of a different respective one of the storage processors 102. Although, in the present example, GM 142 is used to cache data, it will be understood that alternative implementations are possible in which GM 142 is replaced with a different type of cache memory. In other words, the present disclosure is not limited to using any specific type of cache memory.

According to the present example, GM 142 is arranged to store a recent sector signature database 147 (hereinafter "database 147"). Database 147 may be configured to store a set of N sector signatures that have been most recently cached by storage system 133. Database 147 may be separate from the cache where sector signatures have been cached. In this regard, database 147 may be viewed as a secondary offload location for storing sector signatures. Of course, the cache where the sector signatures are cached may also be implemented by using GM 142, but it may use memory locations from database 147. As is discussed further below, database 147 may be used to generate predicted sector signatures. Although database is stored in GM 142, in some implementations, database 147 may be stored in a different storage location. In some implementations, database 147 may be integrated into the aging queue of storage system 133 and it may contain the sector signatures only for those write requests that are currently aging in the aging queue.

In some implementations, database 147 may be device-specific. Additionally or alternatively, in some implementations, database 147 may map each of a plurality of addresses to the corresponding sector signature for this address. Additionally or alternatively, in some implementations database 147 may map a range of tracks that contain n sectors to the respective sector signature for each of the sectors.

Figure 1C:
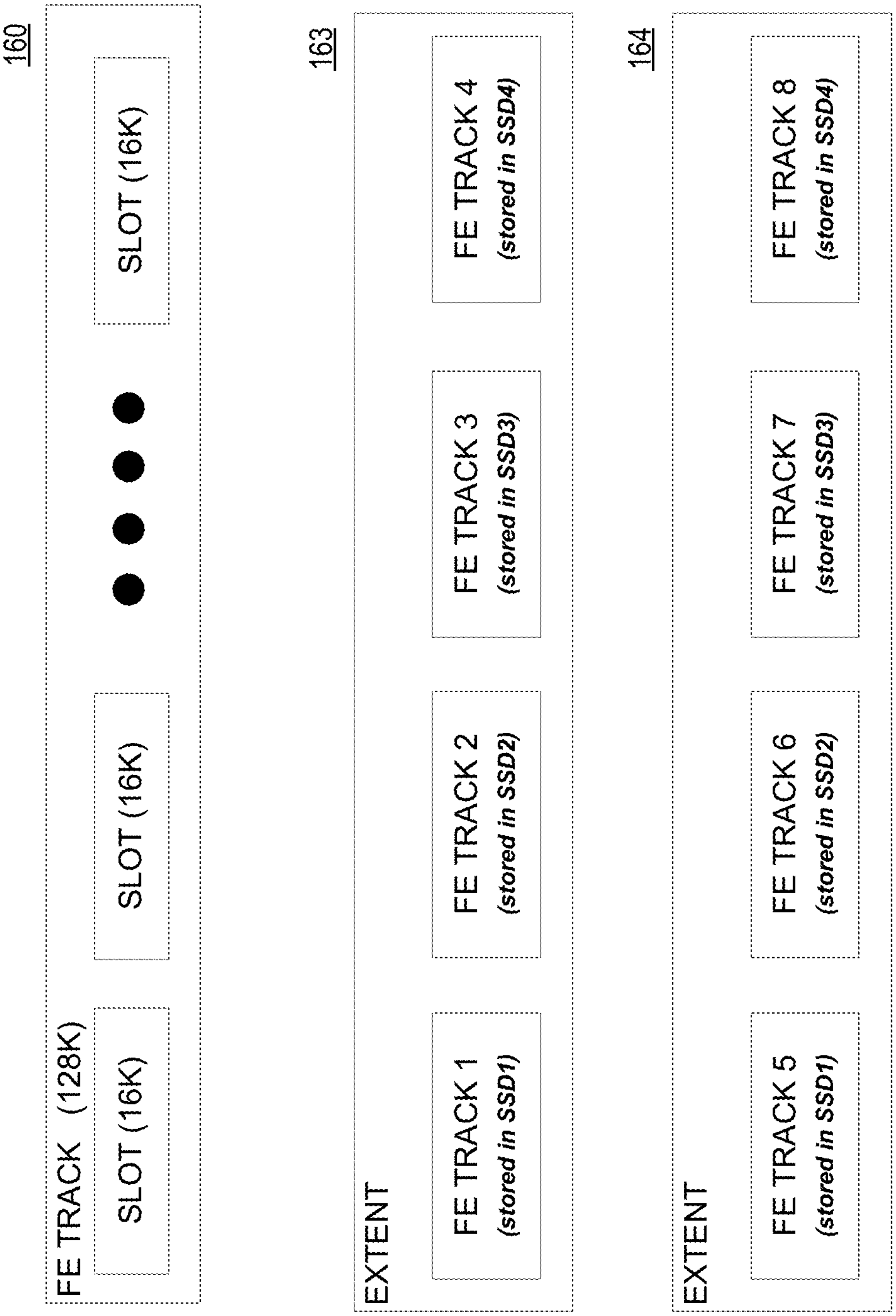
FIG. 1C is a diagram of an example of different units of data storage, according to aspects of the disclosure.

FIG. 1C shows an example of an FE track 160. The term "frontend track" as used throughout the disclosure refers to a data block, or a unit of data storage, in which data is cached into the GM 142. According to the present example, the FE track 160 is 128K in size and it consists of a plurality of slots that are each 16K in size. However, in an alternative implementation, the FE track 160 may have a mix of 64K and 16K slots. Stated succinctly, the present disclosure is not limited to any specific implementation of the FE track 160 and/or the slots that form the FE track. The term "slot" as used herein refers to a smaller unit of data storage that is part of an FE track. Further shown in FIG. 1C are extents 163 and 163. Extent 163 includes FE tracks 1-4 and extent 164 includes FE tracks 5-8. As used herein, the term "extent" refers to a set of sequential FE tracks (i.e., FE tracks having sequential addresses). According to the present example, any of FE tracks 1-8 is the same or similar to FE tack 160.

Figure 1D:
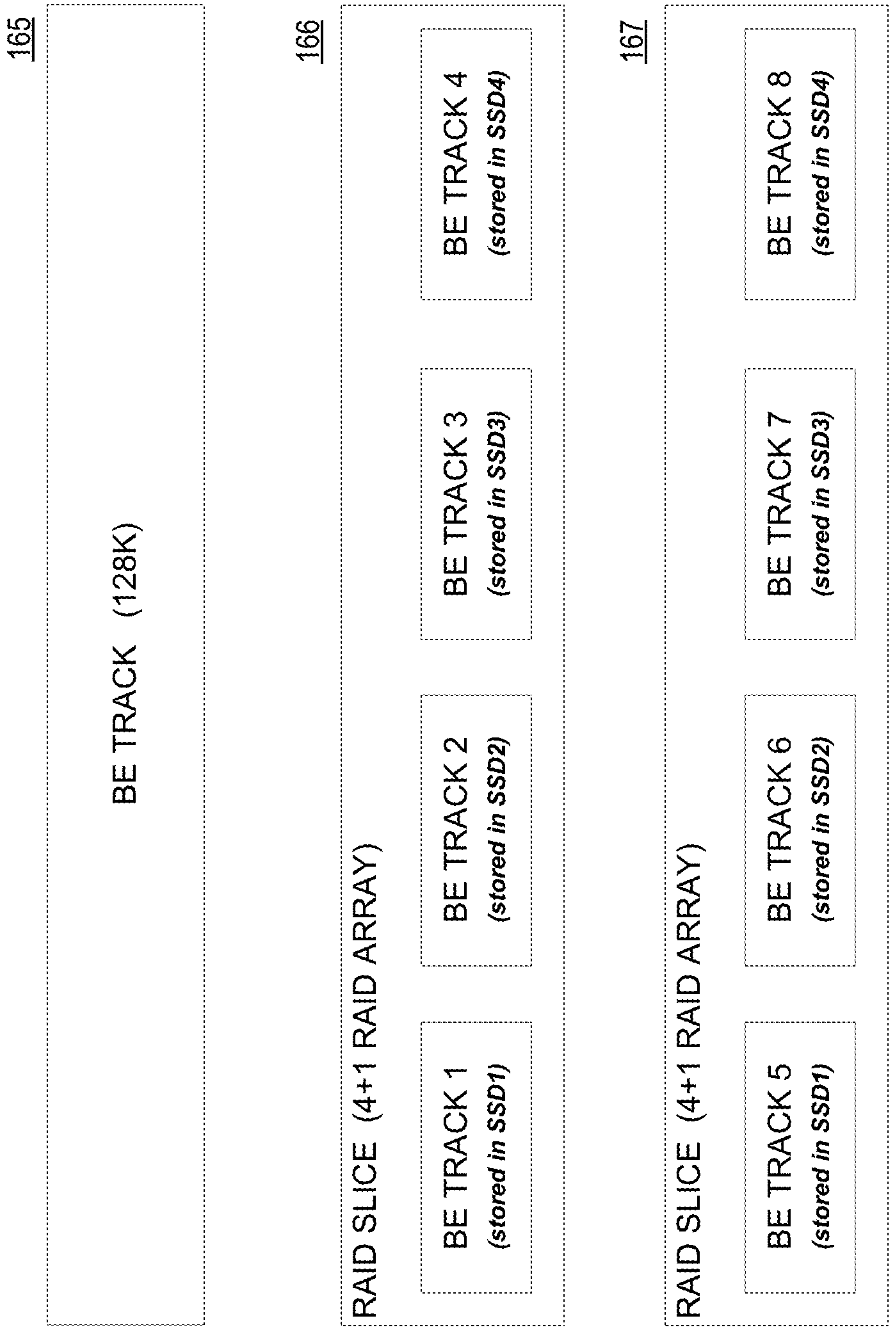
FIG. 1D is a diagram of an example of different units of data storage, according to aspects of the disclosure.

FIG. 1D shows an example of a BE track 165. The term "backend track" as used throughout the disclosure refers to a data block, or a unit of data storage, in which data is stored in the RAID array 103. According to the present example, the BE track 165 is 128K in size. However, the present disclosure is not limited to any specific implementation of the BE track 165. According to the present example, the BE track 165 is not divided into slots as is the case with the FE track 160, which is discussed above with respect to FIG. 1C. However, the present disclosure is not limited thereto, and in some implementations, the BE track 165 may be divided into slots. Stated succinctly, the present disclosure is not limited to any specific implementation of the BE track 165. The term "slot" as used herein refers to a smaller unit of data storage that is part of a BE track. Further shown in FIG. 1D are RAID slices 166 and 167. RAID slice 166 includes BE tracks 1-4 and RAID slice 167 includes BE tracks 5-8. As is well-known in the art, the term "RAID slice" refers to a logical segment or partition of storage within a RAID array. Although, the example of FIG. 1D assumes a 4+1 RAID array, it will be understood that the present disclosure is not limited to any specific type of RAID configuration. Furthermore, it will be understood that the present disclosure is not limited to any specific size of the FE tracks and the BE tracks that are used by storage system 133. The mapping between BE tracks and corresponding RAID slices may be established by a data structure that is stored in the memory of one or more storage processors 102 or elsewhere in storage system 133. The mapping may be static or it may change from time to time. The present disclosure is not limited to any specific method for implementing the mapping. Furthermore, according to the present example, each of the FE tracks is given a unique address that belongs to a frontend track address space maintained at FE 141 and each of the BE tracks is given a unique address that belongs to a backend track address space that is maintained at BE 144.

Figure 1E:
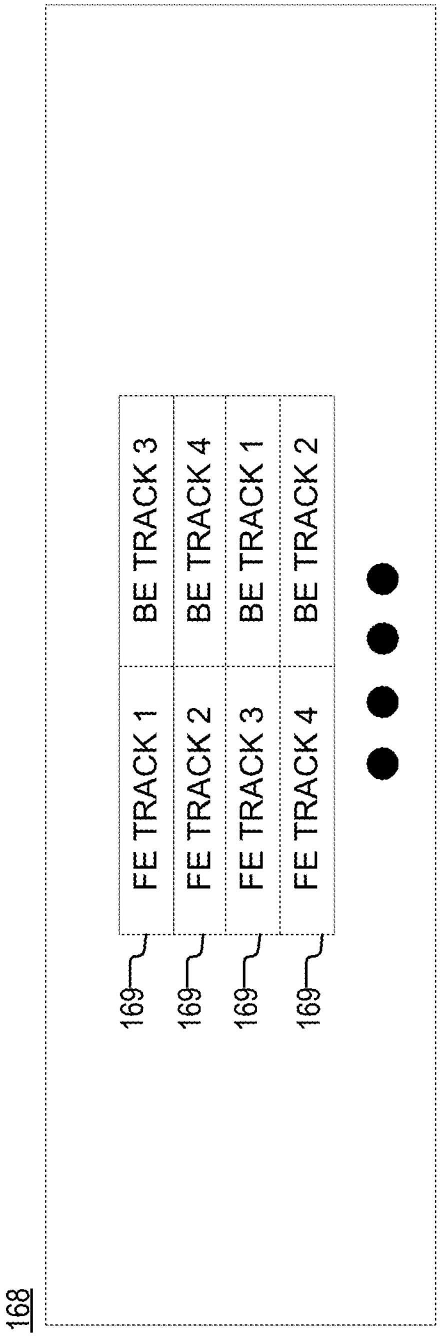
FIG. 1E is a diagram of an example of a data structure, according to aspects of the disclosure.

FIG. 1E is a diagram of an example of a data structure 168, according to aspects of the disclosure. According to the present example, data structure 168 includes a plurality of entries 169. Each entry 169 includes an identifier (e.g., an address) of a respective FE track in GM 142 and an identifier (e.g., an address) of a respective backend track. In other words, data structure 168 is a map that maps each of the plurality FE tracks in GM 142 to a different corresponding one of the backend tracks. The data structure 168 may be stored in the memory of one or more of storage processors 102 and/or elsewhere in the storage system 133. The present disclosure is not limited to any specific implementation of data structure 168. Data structure 168 may be implemented as a single file, a plurality of files, a single database object, a plurality of database objects, and/or in any other suitable manner. Further information about the architecture shown in FIGS. 1A-E can be found in U.S. patent application Ser. No. 18/820,867, entitled INTELLIGENT RELOCATION DESTAGE, which is hereby incorporated by reference herein in its entirety.

Figure 1F:
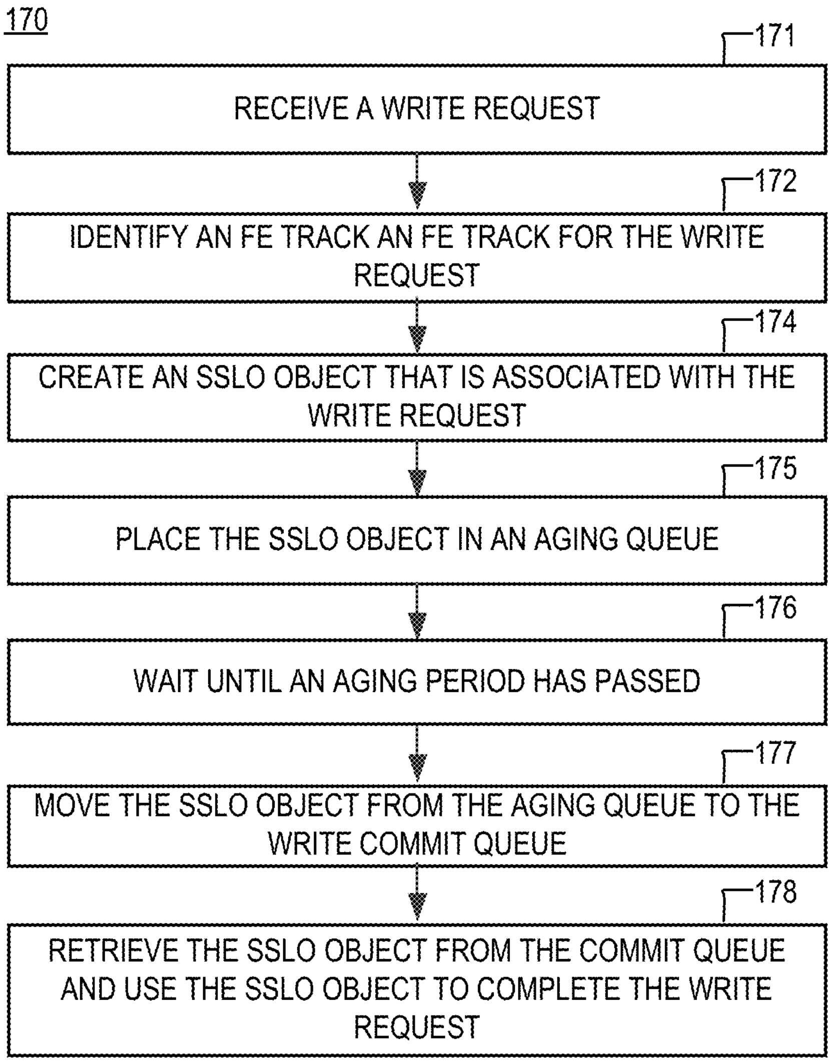
FIG. 1F is a flowchart of an example of a process, according to aspects of the disclosure.

FIG. 1F is a flowchart of an example of a process 170, according to aspects of the disclosure. At step 171, storage system 133 receives a write request. At step 172, storage system 133 identifies an FE track for the write request. The FE track may include user data for the write request (received at step 171) and/or metadata for the write request (eg., a hash digest of the user data, etc.), as well as for other write requests. At step 174, storage system 133 creates an SSLO object for the write request. The SSLO object may include a pointer to the FE track for the write request and/or any other information (or pointers to information) that is needed for executing the write request. At step 175, storage system 133 places the SSLO object in an aging queue. At step 176, storage system 133 waits until a predetermined aging period has passed. After the aging period has passed, at step 177, storage system 133 removes the SSLO object from the aging queue and stores the SSLO object in a write commit queue. At step 178, storage system 133 retrieves the SSLO object from the write commit queue and uses the SSLO object to complete the write request. Further information about the aging queue and SSLO objects can be found in U.S. patent application Ser. No. 19/082,640 entitled "Optimized Metadata Scheduling," which is hereby incorporated herein by reference in its entirety. In some implementations, the phrase "placing a write request in an aging queue" may refer to placing an identifier associated with the write request in a data structure and waiting for a predetermined amount of time to pass before the identifier is retrieved from the data structure and subsequently used in completing the write request.

Figure 1G:
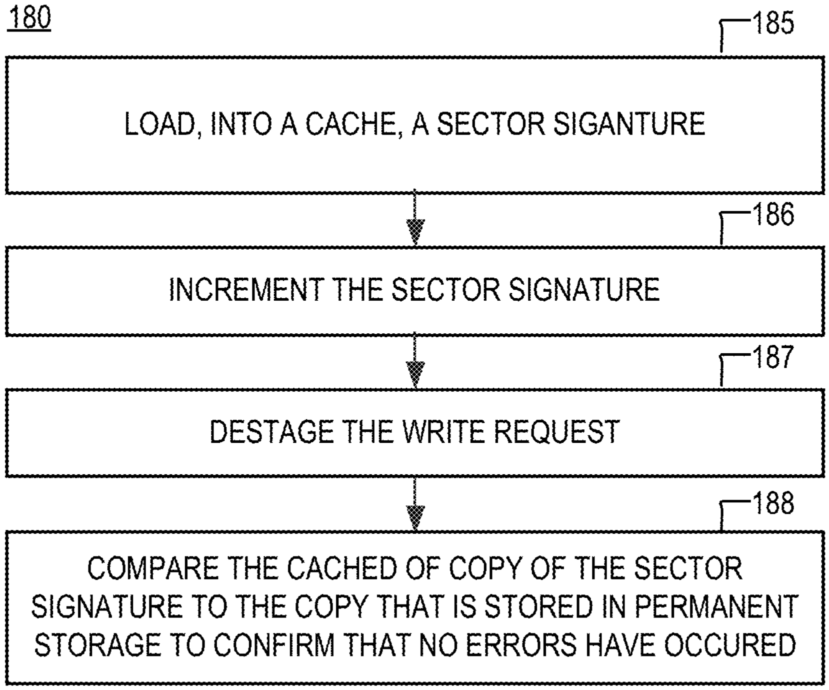
FIG. 1G is a flowchart of an example of a process, according to aspects of the disclosure.

FIG. 1G is a flowchart of an example of a process 180, according to aspects of the disclosure. At step 185, a sector signature for a sector is loaded into a cache (eg., in GM 142). The sector may be part of RAID array 103. The sector may be the same or similar to sector 193, which is discussed further below with respect to FIG. 3. The sector signature may be retrieved from RAID array 103. The sector may correspond to an address where the block of data is going to be stored. The sector signature may serve as a version counter. For redundancy and validation, the sector signature may be stored both within the data block itself and in the associated metadata. In some implementations, the sector signature may be compliant with the T10-DIF standard. At step 186, the sector signature is incremented. Incrementing the sector signature may include incrementing one or more of the block-specific portions in the sector signature (eg., see block-specific portions 195-1 through 195-8, which are shown in FIG. 1I). The sector signature may be incremented by FE 141. At step 187, the write request is destaged by writing data to the sector (e.g., in RAID array 103). Destaging the write request may includes writing host data (i.e, data associated with the write request) from cache to disk (i.e, to the RAID array 103). The destaging may be performed by DS 143 and/or BE 144. At step 188, the sector signature is compared to the copy of the same sector signature in the RAID array 103 to detect any lost writes, which may occur when data fails to be adequately committed to storage. If the outcome of the comparison indicates that writes were lost, storage system 133 may take corrective action. The comparison may be performed by DS 143 and/or BE 144.

Figure 1H:
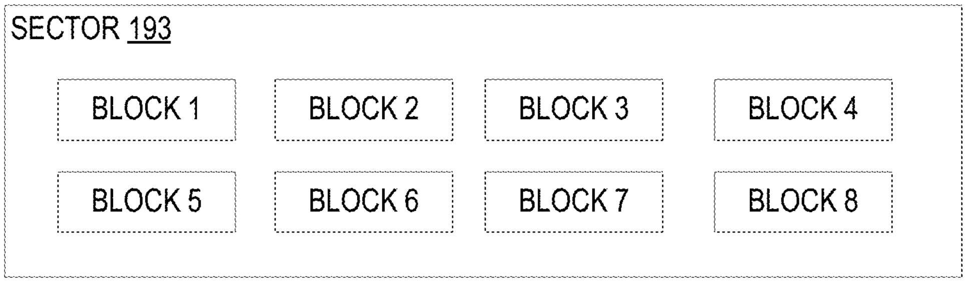
FIG. 1H is a diagram of an example of a sector, according to aspects of the disclosure.
Figure 1I:
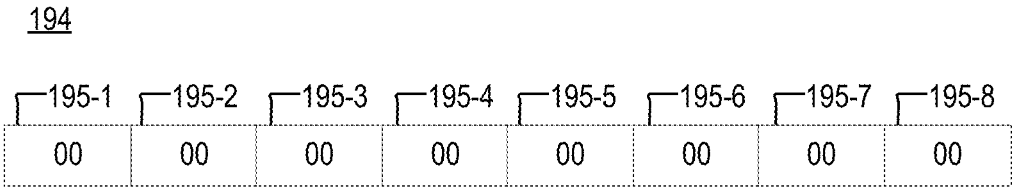
FIG. 1I is a diagram of a sector signature, according to aspects of the disclosure.

FIG. 1H is a diagram of an example of a sector 193, according to aspects of the disclosure. In the example of FIG. 1H, sector 193 includes eight (8) data blocks, which are herein enumerated as blocks 1 through 8. According to the present disclosure, each of blocks 1-8 is 16 bytes wide, but the present disclosure is not limited to the data blocks having any specific size. Furthermore, sector 193 is not limited to including any specific number of blocks being present in sector 193. According to the present disclosure, sector 193 is a unit of storage in RAID array 103. However, it will be understood that sector 193 may be a unit of storage in any storage device.

FIG. 1I is a diagram of an example of a sector signature 194, which corresponds to sector 193. As illustrated, sector signature 194 may include portions 195-1 through 195-8. Each of portions 195-1 through 195-8 may correspond to a different one of blocks 1-8. According to the present example, portion 195-1 corresponds to block 1, and it is incremented every time data is written to block 1. Portion 195-2 corresponds to block 2, and it is incremented every time data is written to block 1. Portion 195-3 corresponds to block 3, and it is incremented every time data is written to block 1. Portion 195-4 corresponds to block 4, and it is incremented every time data is written to block 1. Portion 195-5 corresponds to block 5, and it is incremented every time data is written to block 1. Portion 195-6 corresponds to block 6, and it is incremented every time data is written to block 1. Portion 195-7 corresponds to block 7, and it is incremented every time data is written to block 1. Portion 195-8 corresponds to block 8, and it is incremented every time data is written to block 1.

According to the present example, each of portions 195-1 through 195-8 is 2 bits wide. However, the present disclosure is not limited to any specific size of portions 195-1 through 195-8. According to the present example, each of portions 195-1 through 195-8 is referred to as a "block-specific portion" of sector signature 194. The block-specific portions may be stored contiguously within sector 193 or each block-specific portion may be appended at the end of its corresponding block. For example, when the user data in sector 193 is compressed, sector signature 193 may be situated in sector 193 after the compressed data. On the other hand, when the user data is not compressed, sector signature 194 may be dispersed throughout sector 193, such that each block-specific portion is stored at the end of its corresponding sector block.

According to the present example, each of portions 195-1 through 195-8 is incremented when its corresponding block is written to. Each of portions 195-1 through 195-8 may be incremented separately of the rest when its respective block is written to, and it may wrap back to zero after its maximum value is reached.

FIG. 1J is a diagram illustrating the value of sector signature 194 over a given time period. The period includes time instances T1-5. Each of time instances T1-5 represents the time when a copy of the signature is loaded from RAID array 103 into the cache. In the example of FIG. 1J, each of portions 195-1 through 195-8 is incremented by '1' at each of the times T1 through T5. In some respects, FIG. 1J is provided to illustrate that the sector signature 193 may change over time in accordance with a predetermined pattern. In this pattern, at each turn, data is written to each and every one of the block-specific portions in sector 193. The pattern may depend on the type of data that is stored in sector 193 and/or the type of application that is writing to sector 193.

Figure 2A:
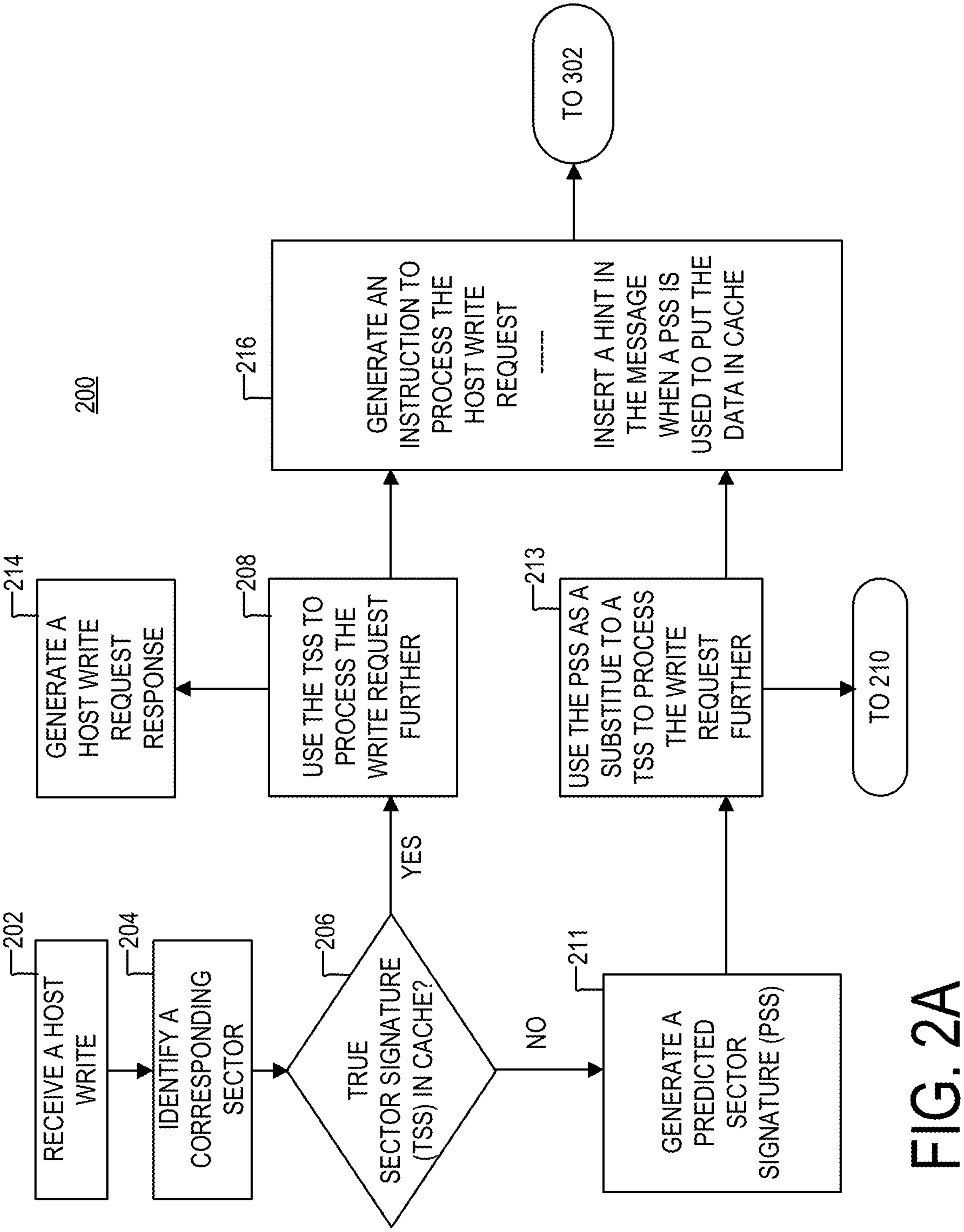
FIG. 2A is a flowchart of an example of a process, according to aspects of the disclosure.

FIG. 2A is a flowchart of an example of a process 200, according to aspects of the disclosure.

At step 202, FE 141 receives a host write. Specifically, FE 141 receives a write request from one of computing devices 130 (shown in FIG. 1A). The write request may include user data as its payload. The write request may instruct storage system 133 to store the user data into RAID array 103.

At step 204, FE 141 identifies a sector in RAID array 103 that is associated with the write request. The identification may be performed as part of selecting the BE track in storage system 133 that is going to be used to execute the write request.

At step 206, FE 141 detects if a true sector signature (TSS) for the sector (identified at step 204) is available in a cache. As used herein, the term true sector signature refers to a copy of the sector signature that is retrieved from RAID array 103 and stored in the cache. If the true sector signature is available in the cache, process 200 proceeds to step 208. Otherwise, process 200 proceeds to step 211.

At step 208, FE 141 uses the true sector signature to process the write request further. The true sector signature may be used to program a transfer of data corresponding to the write request to a cache slot that is going to be used for servicing the write request. Specifically, each portion of the true sector signature may be placed in the 8 byte CRC structure at the end of a different data block in the cache slot. After different portions of the sector signature are placed in the CRC structures of different blocks of the cache slot, the user data or other metadata associated with the write request is stored in the cache. In some implementations, the availability of a sector signature (for the sector identified at step 204) may be a necessary condition for FE 141 to be able to move forward with processing the write request further and transmitting an acknowledgement of the write request.

At step 211, FE 141 generates a predicted signature (PSS) for the sector (identified at step 204). After the predicted sector signature is generated, the predicted sector signature is stored in the cache. According to the present example, the value of a predicted signature. According to the present example, the term "predicted sector signature for a sector" refers to a sector signature that is calculated based on the values of the sector signatures for other sectors, as opposed to a copy of the sector signature (for the sector identified at step 204) that is stored in RAID array 103. The predicted sector signature may or may not be the same as the sector signature that is stored in RAID array 103. The predicted sector signature is used in place of a true sector signature. Using the predicted sector signature is advantageous because it prevents storage system 133 from incurring a response time penalty resulting from having to wait to bring the true sector signature into the cache before processing the write request further (and ultimately acknowledging it at step 210).

At step 213, FE 141 uses the predicted sector signature to process the write request further. The predicted sector signature is used as a substitute for a true sector signature. The predicted sector signature may be used to program a transfer of data corresponding to the write request to a cache slot that is going to be used for servicing the write request. Specifically, each portion of the true sector signature may be placed in the 8 byte CRC structure at the end of a different data block in the cache slot. After different portions of the sector signature are placed in the CRC structures of different blocks of the cache slot, the user data or other metadata associated with the write request is stored in the cache. As noted above, the availability of a sector signature in cache may be a necessary predicate for the processing of the write request to continue up to the point at which the write request can be acknowledged (eg., at step 214). FE 141 may generate the predicted sector signature in a shorter amount of time than it would take to fetch into the cache a true sector signature (for the sector identified at step 204). In this regard, using the predicted sector signature is advantageous because it may help speed up the response time of storage system 133 with the respect to write request. As used herein, the term "response time" refers to the duration of the time period starting when the write request is received (at step 202) and when the write request is acknowledged (at step 214). As can be readily appreciated, for the write request to be acknowledged, the user data associated with the write request needs to be stored in the cache, which is only possible if a sector signature is stored in cache for the sector in RAID array 10 where the user data associated with the write request is going to be stored. Notably, in order for the write request to be acknowledged, the user data need not be stored in RAID array 103—it only needs to be stored in the cache of storage system 133. In other words, the write request can be acknowledged before the user data is destaged into permanent storage.

At step 214, FE 141 transmits an acknowledgement associated with the write request (received at step 202). The acknowledgement is transmitted to the sender of the write request (eg., one of computing devices 130 which are shown in FIG. 1). Step 214 is executed following the completion of either one of steps 208 or 213.

At step 216, FE 141 generates an instruction to process the write request further and transmits the instruction to DS 143. In some implementations, the instruction may include a message requesting DS 143 to begin executing steps that are necessary for the write request to be completed. The message may include an identifier of the write request and/or any other suitable information that is associated with the write request. In addition, the message may include a hint indicating whether the write request (received at step 202) was processed in FE 141 by using a true sector signature or a predicted sector signature. The hint may include any suitable number, string, or alphanumerical string. The hint may be part of the message's payload or part of its header. In one example, the hint may include a single bit. In such instances, the hint may be set to '0' when the write request (received at step 202) was processed by using a true sector signature (at step 208). On the other hand, the bit may be set to '1' when the write request (received at step 202) was processed by using a predicted sector signature (at step 213). The message that is part of the hint may be transmitted via a communications network that is internal to storage system 133, by using a method for interprocess communication and/or in any other suitable manner. After step 216 is completed, the processing of the write request (received at step 202) proceeds to step 302 of process 300 (shown in FIG. 3).

Under the nomenclature of the present disclosure, any action that is described as being performed by FE 141 can be performed by one of FE directors 181 and/or the storage processor 102 that is used to implement the FE director 181. In some implementations, all steps in process 200 may be performed by the same FE director 181 (or the storage processor 102 that is used to implement it). Alternatively, at least two of the steps in process 200 may be performed by different FE directors 181 and/or the storage processors 102 that are used to implement them.

FIG. 2B is a diagram illustrating an example of a method for generating a predicted sector signature, as specified by step 211 of process 200. Shown in FIG. 2B is a diagram of database 147. In one example, database 147 may be implemented as a table having a plurality of rows 231. Each row 231 may identify the address of a sector and the corresponding sector signature for the sector. Database 147 may include the N most recently cached sector signatures, where N is a positive integer greater than 1. In the example of FIG. 2B, all sector signatures that are stored in database 147 are the same (i.e., "0xAAAAAA"), which approximates the pattern one would expect to see when storage system 133 is subjected to sequential writes. In this example, the term "sequential writes" refers to write requests that write data to consecutive sector blocks or to a cluster of addresses that are close to one another.

Consider now an example in which the sector identified at step 204 of process 200 has the address of "0x18". In this example, FE 141 may perform a search of database 147 to detect that the sector signatures in database 147 are the same. In response to determining that the sector signatures are the same, FE 141 may predict that address "0x18" would have the same signature as all other signatures in database 147. Accordingly, FE 141 may use "0xAAAAAA" as the predicted sector signature for sector "0x18". As is discussed further below, if the prediction is incorrect, the predicted sector signature may be reconciled later with the copy of the sector signature for sector "0x18" that is stored in RAID array 103. Accordingly, the use of a predicted sector signature may be a regarded as a stopgap measure implemented by FE 141 to speed up the transmittal of an acknowledgment for a write request, after which the sector signature may be corrected if the prediction is incorrect.

FIG. 2C is a diagram illustrating another example of a method for generating a predicted sector signature, as specified by step 211 of process 200. Shown in FIG. 143 is a diagram of database 147. As illustrated, database 147 may be implemented as a table having a plurality of rows 231. Each row in the table may identify the address of a sector and the corresponding sector signature for the sector. It will be recalled that database 147 may include the N most recently cached sector signature, where N is a positive integer greater than 1. In the present example, the sector signatures in database 147 are grouped in clusters. The first cluster has the signature of "0xAAAAAA", the second cluster has the signature of "0x800000", and the third cluster has the signature of "0xC00000". This arrangement of sector signature may approximate the pattern one would expect to see when storage system 133 is subjected to short bursts of sequential writes. In this example, sequential writes refers to write requests that write data to consecutive addresses or to a cluster of addresses that are close to one another.

Consider now an example when the sector identified at step 204 of process 200 has the address of "0x18". In this example, FE 141 may perform a search of database 141 to detect that the sector signatures in database 147 are clustered. In response to determining that the sector signatures are clustered, FE 141 may predict that address "0x18" would have the same signature as the last cluster in database 147 (i.e, the cluster whose signatures are stored more recently in database 147 than all other sector signatures in database 147). Accordingly, FE 141 may use "0x0xC00000" as the predicted sector signature for sector "0x18". As is discussed further below, if the prediction is incorrect, the predicted sector signature may be reconciled with the copy of the sector signature for sector "0x18" that is stored in RAID array 103. Accordingly, the use of a predicted sector signature may be a regarded as a stopgap measure implemented by FE 141 to speed up the transmittal of an acknowledgment for a write request, after which the sector signature may be corrected if the prediction is incorrect.

Figure 2D:
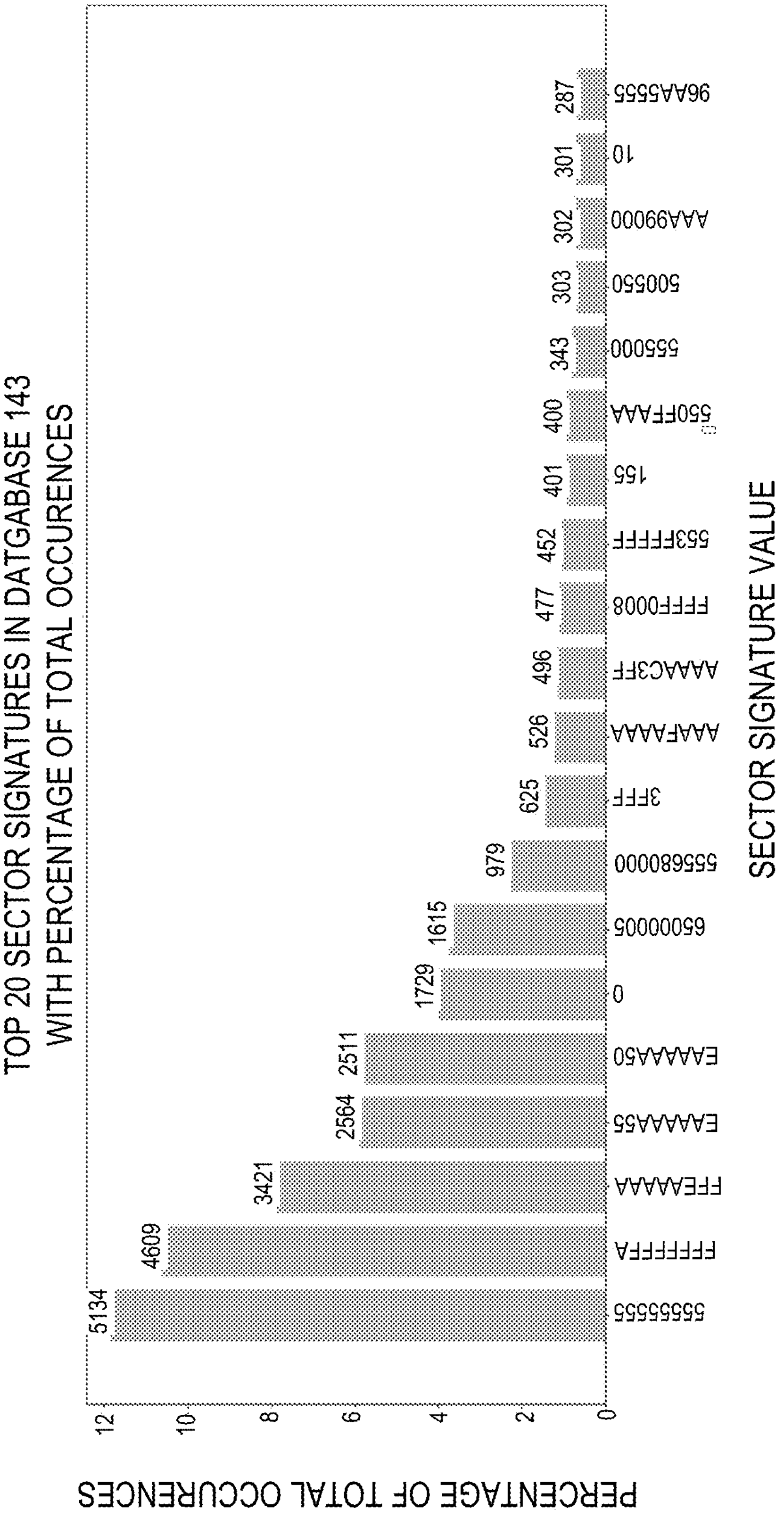
FIG. 2D is a histogram illustrating a distribution of sector signatures in a sector signature database, according to aspects of the disclosure.

FIG. 2D is a histogram illustrating the 20 most frequently occurring sector signatures in database 147. The X-axis of the plot represents the sector signature values, while each column indicates the number of occurrences of its corresponding signature in database 147. The signature value is displayed below each column, with the total count of occurrences of the signature shown atop the column. The Y-axis reflects the percentage of total occurrences. For instance, FIG. 2D reveals that the signature "55555555" is the most frequently occurring sector signature in database 147, with 5134 entries 231 containing this signature, making up approximately 12 percent of all entries in database 147. Additionally, the sector signature "FFFFFFFA" ranks as the second most frequent in database 147, with a total of 4,609 entries 231 containing this signature, which accounts for about 11 percent of all entries in database 147. In some respects, FIG. 2D provides a more realistic representation of the number of sector signatures that would be found in database 147. This number can be larger than the total count of sector signatures that could be present in cache at any given time.

A discussion is now provided of a process executed by FE 141 for generating a predicted sector signature. In one example, FE 141 may include rule-based engine that is executed on one or more computing devices that are part of the FE 141. The rule-based engine may be configured to scan the sector signatures that are stored in database 147 and execute a rule for generating a predicted sector signature based on the second signatures that are stored in database 147. In one example, one possible rule may provide that the predicted signature should be identical to the most frequently occurring signature found in database 147. In such implementations, the rule-based engine may scan database 147 to identify which signature appears most often and assign the predicted sector signature the same value as this most frequently occurring sector signature. It is worth noting that in one example database 147 may contain multiple entries, with each entry holding a respective sector signature. Therefore, in this example, the most frequently occurring sector signature is defined as the one that is present in the highest number of entries at the time of scanning database 147 compared to all other signatures stored within it.

Additionally or alternatively, the rule-based engine may employ another rule. For example, the rule may provide that the predicted sector signature should be equal to the most recently added sector signatures in database 147 that is contained in N or more entries, where N is a positive integer greater than 2. In such implementations, the rule-based engine may begin scanning database 147 in an order in which signatures are added, starting from the most recently added signature. Specifically, the rule-based engine may begin retrieving the signatures in database 147, starting from the most recently added. Each retrieved signature may be examined to determine if N or more of the entries in database 147 contain this signature. If N or more of the entries in database 147 contain the signature, the rule-based engine may cause the predicted sector signature to have the same value as the retrieved signature. Otherwise, the rule-based signature may retrieve the next signature from database 147 and examine it in the same way.

Additionally or alternatively, FE 141 may execute a machine learning model to generate a sector signature. In one example, the machine learning model may be implemented as a neural network. The neural network may receive sector signatures that are stored in database 147 and output a predicted sector signature that is generated based on the sector signatures stored in database 147. The neural network may be trained using a supervised learning algorithm. The neural network may be trained by using an annotated training data set that includes a plurality of entries. Each entry may include a plurality of sector signatures and a label that identifies a sector signature corresponding to the set of sector signatures.

The prediction of sector signatures based on accumulated historical statistics is feasible because each type of write request submitted to storage system 133 may have its own unique updating pattern. This leads to changes in the sector signatures of the sectors where the data from these write requests is stored, following this pattern closely. In this context, the techniques discussed above take advantage of the consistency in sector signatures to generate a predicted sector signature.

Figure 3:
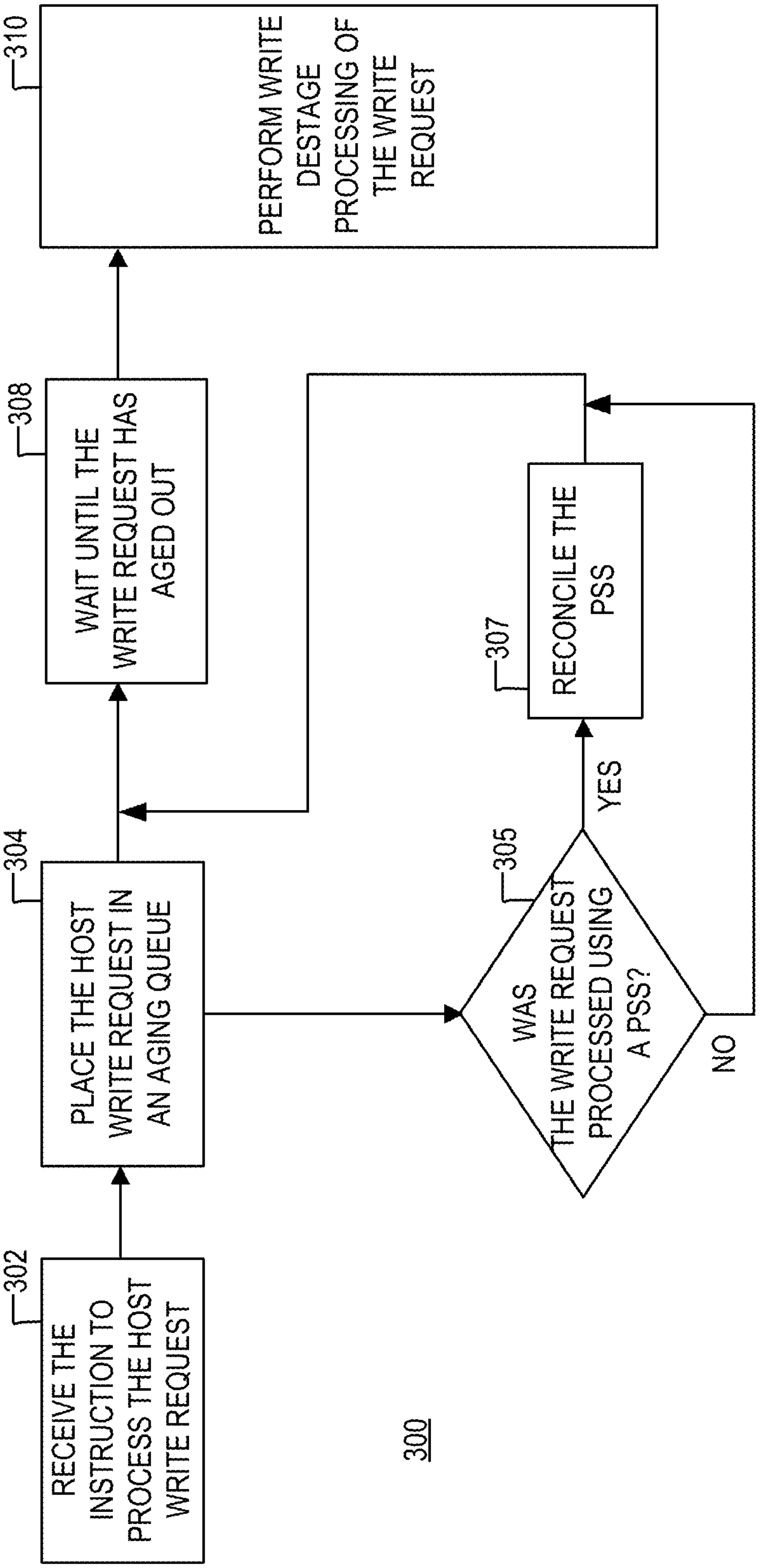
FIG. 3 is a flowchart of an example of a process, according to aspects of the disclosure.

The present disclosure is not limited to the methods mentioned for generating a predicted sector signature. To predict a sector signature, FE 141 may utilize statistical methods to identify long-term trends in sector signature patterns, such as regression analysis. Moving averages can be employed to smooth out short-term fluctuations. Additionally, clustering algorithms and other statistical techniques may be applied to detect anomalies in metadata access patterns. These anomalies could indicate changes in workload or unusual access behaviors. The identified trends and/or anomalies can then be used to determine the predicted sector signature FIG. 3 is a flowchart of an example of a process 300, according to aspects of the disclosure.

At step 302, DS 143 receives the instruction (generated at step 216, process 200) to process the host request (received at step 202, process 200).

At step 304, DS 143 places the write request in an aging queue.

At step 305, DS 143 detects whether the write request was processed by using a predicted sector signature at the front end (i.e., at FE 141). According to the present example, DS 143 may process the instruction (received at step 302) to determine whether the instruction contains a hint indicating that the write request was processed by using a true sector signature. If the hint indicates that the write request was processed by using a predicted sector signature, processes 300 proceeds to step 307. If the hint indicates that the write request was processed by FE 141 by using a true sector signature, process 300 proceeds to step 308, without going through step 307 first.

At step 307, process 300 reconciles the predicted sector signature used by FE 141 to process the write request (received at step 202). The reconciliation of the predicted sector signature may include: (i) retrieving from RAID array 103 a true copy of the sector signature for the sector (identified at step 204, process 200), (ii) detecting whether the true sector signature (retrieved at step 307) matches the predicted sector signature (generated at step 211), if the true sector signature does not match the predicted sector signature, taking a corrective action and the proceeding to step 308, if the true sector signature matches the predicted sector signature, proceeding to step 308 without taking the corrective action. In this example, the predicted sector signature is considered a match the true sector signature only when they are identical. However, in alternative scenarios, the predicted sector signature may also be deemed a match if modifying the true sector signature in a specific way results in the predicted sector signature. For instance, if incrementing the true sector signature, as required by the write request received in step 202, makes it identical to the predicted sector signature, then a match is identified. The corrective action may involve one or more of the following: (i) adjusting the predicted sector signature to ensure it matches the true sector signature or the value that the true sector signature would take after being incremented (or otherwise processed) according to the write request; and/or (ii) storing the true sector signature at a predetermined memory location where it can be retrieved and used to complete the write request.

At step 308, DS 143 waits until the write request has aged out of the aging queue. According to the present example, the write request is aged out of the aging queue if the write request has spent longer than a predetermined amount of time in the aging queue. In some implementations, step 308 may be performed concurrently with steps 305 and 307 being executed. In other words, while the write request is aging in the aging queue, DS 143 may perform additional processing related to the reconciliation of the predicted sector signature (generated at step 211 of process 200), with the true copy of the sector signature for the same sector, which is stored in RAID array 103.

At step 310, the write request (received at step 202) is destaged. In some implementations, the destaging of the write request may be performed by transmitting from DS 143 to BE 144 an instruction to store the user data in the RAID array 103.

A brief discussion is provided regarding the corrective actions taken when the predicted sector signature (created at step 211) does not match the true sector signature (obtained at step 307). According to the present disclosure, these corrective actions can be performed using three different methods referred to as: (i) a fix-by-block method, (ii) a relocation method, and (iii) a check-and-replace method.

The fix-by-block method is now described in further detail. This method may be executed by Data Storage (DS) 143. In one example, the fix-by-block method involves modifying the predicted sector signature to align with the true sector signature. This modification entails identifying the respective memory locations where each block-specific portion of the predicted sector signature is stored and overwriting those memory locations with the correct values from the true sector signature (obtained at step 307). Once the modification is complete, the predicted sector signature effectively matches the true sector signature. After the modification, the corrected sector signature may be used to complete the write request as discussed above. For example, the copy of the true sector signature may be written into the sector of the RAID array 103 (identified at step 204) together with the sector signature. For example, each of the block-specific portions of the sector signature may be inserted in its corresponding sector block, etc. In some implementations, each portion of a sector signature may be stored in the CRC structure of a different block of the sector signature's corresponding sector. In such implementations, each portion of the true sector signature may be copied into the CRC structure of a different block of the sector, thus overwriting a portion of a predicted sector signature that is present in the CRC portion.

The relocation method is now described in further detail. This method, performed by DS 143 or BE 144. This method can only be utilized when the user data associated with the write request is compressed prior to being stored in RAID array 103. In such cases, the sector signature is included in the header of a message instructing BE 144 to store the compressed user data in RAID array 103 or in a header of a massage transporting the user data to the RAID array 103. In response to the message, either BE 144 or a process within it may store the compressed user data along with the sector signature in RAID array 103. When the write request, the compressed user data and/or the sector signature may be stored in the sector of RAID array 103 that is identified at step 204.

The check-and-replace method is employed when the user data is uncompressed and is carried out by the hardware used to transfer the user data from the cache to RAID array 103. This hardware could include the host bus adapter in one of the storage processors 102, a controller associated with the host bus adapter, a switch in the network connecting the storage processor to RAID array 103, or the controller of that switch. During the check-and-replace process, the true sector signature (obtained at step 307) is stored at a specific memory location; then, the hardware is instructed to use the true sector signature instead of the predicted one throughout the actions performed during the data transfer. Generally, when the write request is processed, a data transfer occurs from the cache into RAID array 103. During the final data transfer, the hardware will be provided with the memory location address where the true copy of the sector signature is stored and instructed to utilize this true copy instead of the predicted one. Using the predicted sector signature may involve inserting block-specific portions of the sector signature into their corresponding data blocks before they are written into RAID array 103, along with any other appropriate actions. In some implementations, the check and replace method may have two steps. The first step may involve if the true signature (or its corresponding portion) matches the predicted sector signature that is stored in each block of a cached sector. The second step may involve replacing each predicted sector signature portion that does not match a corresponding true sector signature portion with the corresponding sector signature portion. The true sector signature along with the address of the cache slot may be stored in the write destage message that is transmitted from DS 143 to BE 144 to trigger the destaging of data that is stored in the cache slot into the RAID array 103.

Under the nomenclature of the present disclosure, any action that is described as being performed by DS 143 can be performed by one of DS directors 183 and/or the storage processor 102 that is used to implement the DS director 183. In some implementations, all steps in process 300 may be performed by the same DS director 183 (or the storage processor 102 that is used to implement it). Alternatively, at least two of the steps in process 300 may be performed by different DS directors 183 and/or the storage processors 102 that are used to implement them.

In the example of FIGS. 2A-3, all user data associated with the write request can fit in a single sector. However, in alternative implementations, the user data may fit into multiple sectors. In such implementations, the respective sector signature for each sector may be predicted and used in the same manner as discussed with respect to FIGS. 2A-3.

When permitted be context, the phrases "true sector signature" and "true copy of a sector signature" may be used interchangeably to refer to a first copy of a sector signature for a given sector which is the same as the copy of the sector signature for the same sector which is stored in RAID array 103 or other permanent storage. Also, when permitted by context, the phrase "true sector signature for a given sector" may refer to the sector signature for the given sector that is stored in RAID array 103 or other permanent storage. The use of the term "copy" is not necessarily intended to imply that there are multiple copies of the sector signature stored in cache, RAID array 103, or elsewhere. When permitted be context, the phrases "predicted sector signature" and "predicted copy of a sector signature" refer to the predicted sector signature that is generated at step 211 of process 200. The use of the term "copy" is not necessarily intended to imply that there are multiple copies of the predicted sector signature stored in cache, RAID array 103, or elsewhere.

Although the examples provided with respect to FIGS. 2A-3 involve the prediction of sector signatures, the present disclosure is not limited to predicting any type of metadata that is necessary for processing the write request. Specifically, FE 141 may check if the metadata is available in cache. If the metadata is not available, FE 141 may generate a predicted metadata based on the values of N most recent instances of the same type of metadata which have been cached. As noted above, the predicted value may be set to equal the most frequently occurring value of the metadata instances, the most recently cached metadata value that occurs more than X times metadata instances (where X is a positive integer), or by using a neural network that receives the N most recent metadata instances as input and outputs predicted metadata value.

As noted above, storage system 133 practices a delayed write, where write requests are placed in an aging queue, and completed after a predetermined time period has passed since the inclusion of the write requests in the aging queue. Placing a write request in the aging may refer to placing any suitable identifier that is associated with the write request in a data structure used to implement the aging queue. The data structure may be a linked list and/or any other suitable type of data structure.

A delayed write can take a significant amount of time, providing the opportunity to reconcile metadata mismatch with flexible timing using existing destage algorithms and protocols. During this process, a metadata pattern can be collected from pending write requests being aged for statistical/AI analysis and metadata prediction. In addition, the reconciliation results may provide feedback for prediction to enhance accuracy. In other words, in the example of FIG. 3, step 307, at which the predicted signature is reconciled, may be performed concurrently with step 308. It will be recalled at step 308, process 300 waits for the write request to age out of the aging queue. Furthermore, while step 308 database 147 may be updated or otherwise managed.

Figure 4:
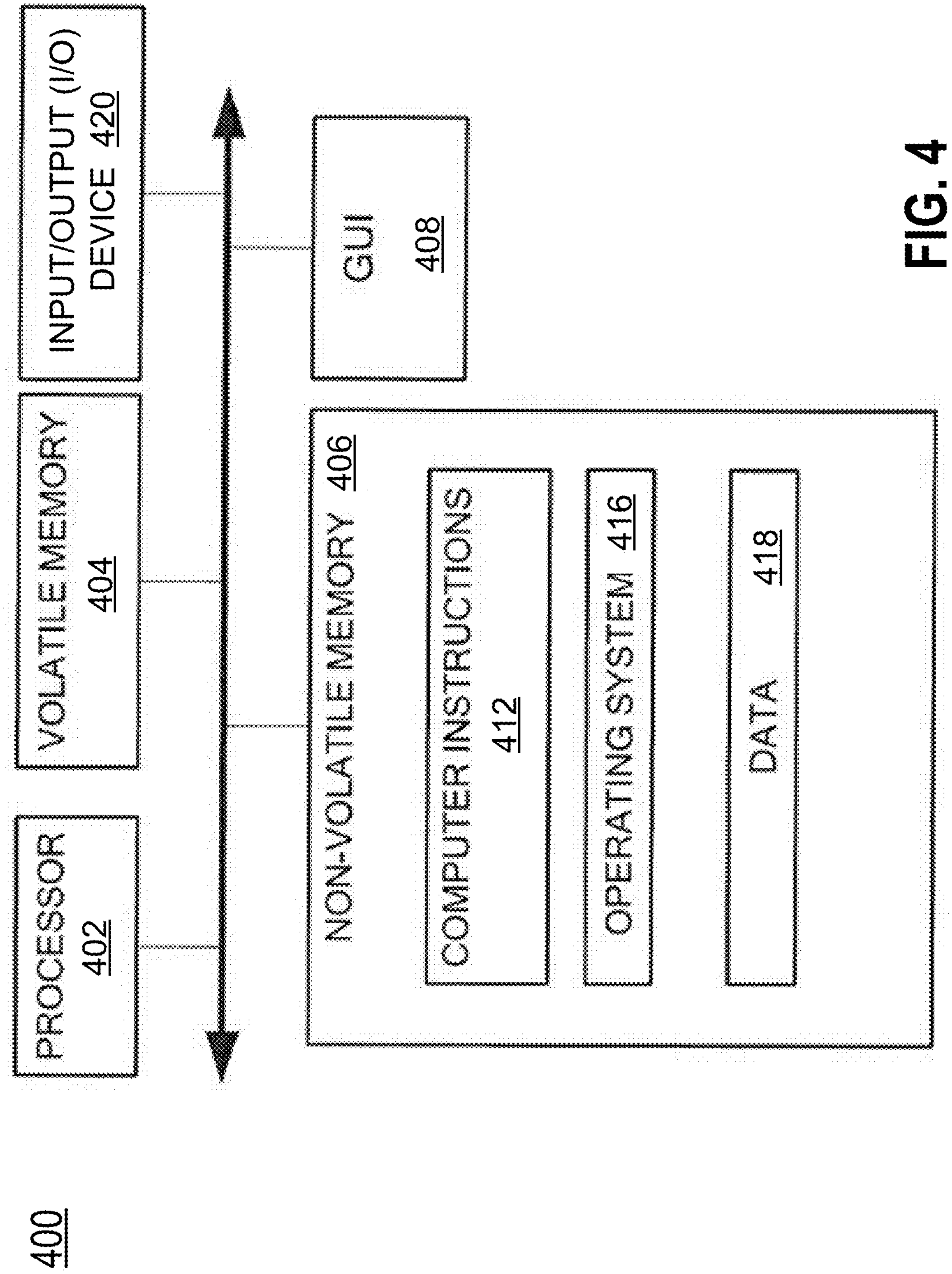
FIG. 4 is a diagram of an example of a computing device, according to aspects of the disclosure.

Referring to FIG. 4, in some embodiments, a device 400 may include processor 402, volatile memory 404 (e.g., RAM), non-volatile memory 406 (e.g., a hard disk drive, a solid-state drive such as a flash drive, a hybrid magnetic and solid-state drive, etc.), graphical user interface (GUI) 408 (e.g., a touchscreen, a display, and so forth) and input/output (I/O) device 420 (e.g., a mouse, a keyboard, etc.). Non-volatile memory 406 stores computer instructions 412, an operating system 416 and data 418 such that, for example, the computer instructions 412 are executed by the processor 402 out of volatile memory 404. Program code may be applied to data entered using an input device of GUI 408 or received from I/O device 420.

FIGS. 1A-4 are provided as an example only. In some embodiments, the term "I/O request" or simply "I/O" may be used to refer to an input or output request. At least some of the steps discussed with respect to FIGS. 1-4 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks". The acronym "CRC" stands for "cyclical redundancy check." In the example of FIGS. 1A-4, storage system 133 is a content-addressable storage system. However, the concept and ideas presented throughout the specification can be applied to location-addressable storage systems and/or any other suitable type of storage system. In the example of FIG. 1H, sector 193 includes eight blocks. However, the present disclosure is not limited to any specific number of sectors being included in a sector. For instance, the example of FIGS. 2B-C features 12 blocks per sector and the example of FIG. 2D features 16 blocks per sector.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus. In the example of FIGS. 1A-8, storage system 133 is a content-addressable storage system. However, the concept and ideas presented throughout the specification can be applied to location-addressable storage systems and/or any other suitable type of storage system.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:

receiving a write request;

identifying a sector that corresponds to the write request, the sector being a unit of storage in a permanent storage of the storage system, the sector including a plurality of blocks;

detecting whether a true copy of a sector signature corresponding to the write request is stored in a cache, wherein the sector signature includes plurality of block-specific portions, each block-specific portion corresponding to a different one of the plurality of blocks, each block-specific portion being a counter that is incremented every time data is written to the block-specific portion's corresponding block;

when the true copy of the sector signature is stored in the cache, acknowledging the write request and subsequently completing the write request;

when the true copy of the sector signature is not stored in the cache, generating a predicted copy of the sector signature based on a plurality of sector signatures that have been stored in the cache during a predetermined period, acknowledging the write request after the predicted copy of the sector signature is generated, retrieving the true copy of the sector signature from the permanent storage, reconciling the predicted copy of the sector signature with the retrieved true copy of the sector signature, the reconciling being performed to after the write request is acknowledged, and completing the write request after the predicted copy of the sector signature is reconciled with the true copy of the sector signature.

2. The method of claim 1, wherein generating the sector signature includes identifying a most frequently occurring sector signature in the plurality and setting the predicted copy of the sector signature to a value of the most frequently occurring sector signature.

3. The method of claim 1, wherein the predicted copy of the sector signature is generated based on a frequency of occurrence of sector signatures in the plurality.

4. The method of claim 1, wherein reconciling the predicted copy of the sector signature with the true copy of the sector signature includes comparing the true copy of the sector signature with the predicted copy of the sector signature and causing the predicted copy of the sector signature to become identical to the true copy of the sector signature by overwriting one or more memory locations where the predicted copy of the sector signature is stored with portions of the true copy of the sector signature.

5. The method of claim 1, wherein reconciling the predicted copy of the sector signature with the true copy of the sector signature includes using the true copy of the sector signature as a header to compressed data that is associated with the write request.

6. The method of claim 1, wherein reconciling the predicted copy of the sector signature includes programming a host bus adapter or a switch that effectuates a transfer of data associated with the write request from the cache to the permanent storage to use the true copy of the sector signature instead of the predicted copy of the sector signature.

7. The method of claim 1, wherein the permanent storage includes a redundant array of independent disks (RAID) array, and acknowledging the write request includes transmitting an acknowledgement message to a sender of the write request.

8. The method of claim 1, wherein reconciling the predicted copy of the sector signature with the true copy of the sector signature includes causing the predicted copy of the sector signature to become identical to the true copy of the sector signature.

9. The method of claim 1, wherein the predicted copy of the sector signature is generated by executing a machine learning model based on the plurality of sector signatures.

10. A system, comprising:

a memory; and at least one processor that is operatively coupled to the memory, the at least one processor being configured to perform the operations of:

receiving a write request;

identifying a sector that corresponds to the write request, the sector being a unit of storage in a permanent storage, the sector including a plurality of blocks;

detecting whether a true copy of a sector signature corresponding to the write request is stored in a cache, wherein the sector signature includes plurality of block-specific portions, each block-specific portion corresponding to a different one of the plurality of blocks, each block-specific portion being a counter that is incremented every time data is written to the block-specific portion's corresponding block;

when the true copy of the sector signature is stored in the cache, acknowledging the write request and subsequently completing the write request;

when the true copy of the sector signature is not stored in the cache, generating a predicted copy of the sector signature based on a plurality of sector signatures that have been stored in the cache during a predetermined period, acknowledging the write request after the predicted copy of the sector signature is generated, retrieving the true copy of the sector signature from the permanent storage, reconciling the predicted copy of the sector signature with the retrieved true copy of the sector signature, the reconciling being performed to after the write request is acknowledged, and completing the write request after the predicted copy of the sector signature is reconciled with the true copy of the sector signature.

11. The system of claim 10, wherein generating the sector signature includes identifying a most frequently occurring sector signature in the plurality and setting the predicted copy of the sector signature to a value of the most frequently occurring sector signature.

12. The system of claim 11, wherein the predicted copy of the sector signature is generated based on a frequency of occurrence of sector signatures in the plurality.

13. The system of claim 10, wherein reconciling the predicted copy of the sector signature with the true copy of the sector signature includes comparing the true copy of the sector signature with the predicted copy of the sector signature and causing the predicted copy of the sector signature to become identical to the true copy of the sector signature by overwriting one or more memory locations where the predicted copy of the sector signature is stored with portions of the true copy of the sector signature.

14. The system of claim 10, wherein reconciling the predicted copy of the sector signature with the true copy of the sector signature includes using the true copy of the sector signature as a header to compressed data that is associated with the write request.

15. The system of claim 10, wherein reconciling the predicted copy of the sector signature includes programming a host bus adapter or a switch that effectuates a transfer of data associated with the write request from the cache to the permanent storage to use the true copy of the sector signature instead of the predicted copy of the sector signature.

16. The system of claim 10, wherein the permanent storage includes a redundant array of independent disks (RAID) array, and acknowledging the write request includes transmitting an acknowledgement message to a sender of the write request.

17. The system of claim 10, wherein reconciling the predicted copy of the sector signature with the true copy of the sector signature includes causing the predicted copy of the sector signature to become identical to the true copy of the sector signature.

18. The system of claim 10, wherein the predicted copy of the sector signature is generated by executing a machine learning model based on the plurality of sector signatures.

19. A method for use in a storage system, comprising:

receiving a write request;

detecting that a true copy of metadata corresponding to the write request is not stored in a cache;

when the true copy of the metadata is not stored in the cache, generating a predicted copy of the metadata, retrieving the true copy of the metadata from a permanent storage, reconciling the predicted copy of the metadata with the retrieved true copy of the metadata, the reconciling being performed to after the write request is acknowledged, and completing the write request after the predicted copy of the metadata is reconciled with the true copy of the metadata, wherein the reconciling is performed concurrently with the write request being aged out in an aging queue.

20. The method of claim 19, wherein the metadata includes a sector signature.

* * * * *